(12) United States Patent
Falkowitz et al.

(10) Patent No.: US 9,609,013 B1
(45) Date of Patent: *Mar. 28, 2017

(54) DETECTING COMPUTER SECURITY THREATS IN ELECTRONIC DOCUMENTS BASED ON STRUCTURE

(71) Applicant: AREA 1 SECURITY, INC., Menlo Park, CA (US)

(72) Inventors: Oren Falkowitz, Redwood City, CA (US); Philip Syme, Ellicot City, MD (US)

(73) Assignee: AREA 1 SECURITY, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/162,233

(22) Filed: May 23, 2016

Related U.S. Application Data

(63) Continuation of application No. 14/723,251, filed on May 27, 2015, now Pat. No. 9,350,757.

(51) Int. Cl.
   *H04L 29/06* (2006.01)
(52) U.S. Cl.
   CPC .......... *H04L 63/1433* (2013.01); *H04L 63/02* (2013.01); *H04L 63/145* (2013.01)
(58) Field of Classification Search
   CPC .................................................... H04L 63/145
   See application file for complete search history.

(56) References Cited

U.S. PATENT DOCUMENTS

| 7,463,590 B2 | 12/2008 | Mualem et al. |
| 2004/0015725 A1 | 1/2004 | Boneh et al. |
| 2004/0034773 A1 | 2/2004 | Balabine et al. |
| 2004/0088564 A1 | 5/2004 | Norman |

OTHER PUBLICATIONS

U.S. Appl. No. 14/723,251, filed May 27, 2015, First Office Action Interview, Jul. 16, 2015.
U.S. Appl. No. 14/723,251, filed May 27, 2015, Notice of Allowance, Jan. 21, 2016.
U.S. Appl. No. 14/723,251, filed May 27, 2015, First Office Action Interview, Sep. 2, 2015.

*Primary Examiner* — Jason K Gee
(74) *Attorney, Agent, or Firm* — Hickman Palermo Becker Bingham LLP

(57) ABSTRACT

In an embodiment, a method providing an improvement in remediating vulnerabilities in computer security comprising: receiving, using a network tap of a sensor computer that is coupled to a compromised computer, a communication packet that was sent from the compromised computer to a target computer; using the sensor computer, determining that the target computer is one of a plurality of enterprise computers; reading, at the sensor computer, a plurality of fields within a header of the communication packet; and performing a remediation measure by generating a header of an action packet, wherein the header comprises duplicates of at least some fields of the plurality of fields so as to appear to be generated by the target computer, generating a payload of the action packet, and sending the action packet comprising the generated header and the generated payload to the compromised computer.

1 Claim, 11 Drawing Sheets

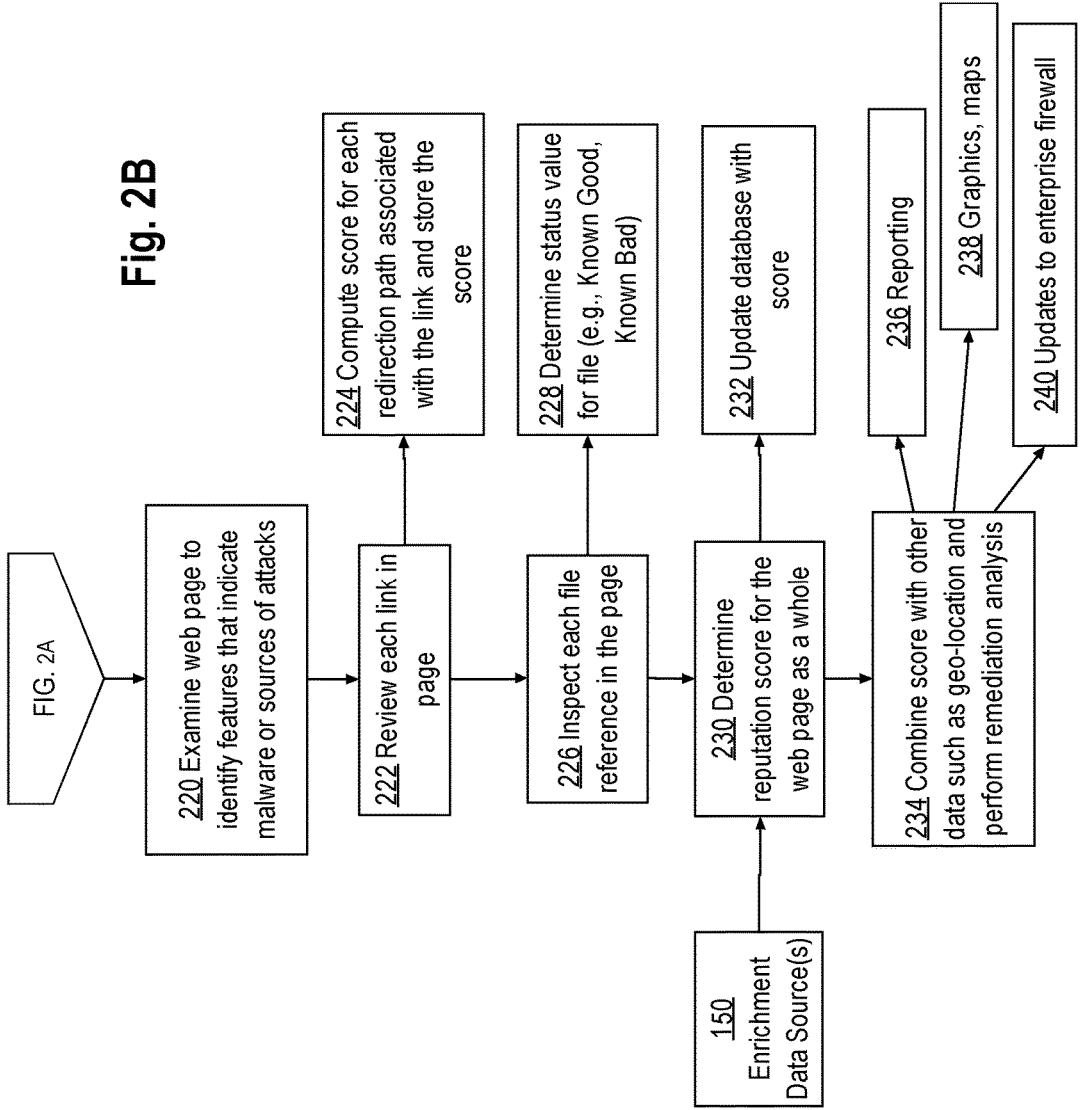

DETECTING COMPUTER SECURITY THREATS IN ELECTRONIC DOCUMENTS BASED ON STRUCTURE

CROSS-REFERENCE TO RELATED APPLICATIONS; BENEFIT CLAIM

This application claims the benefit as a Continuation of application Ser. No. 14/723,251, filed May 27, 2015 and issuing as U.S. Pat. No. 9,350,757, the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

FIELD OF THE DISCLOSURE

The present disclosure generally relates to computer security techniques applicable to computers that have been compromised with bots and other malware, and relates more specifically to techniques for remediating the security threats using a distributed network of sensor computers.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In computer networking and security, a troublesome problem involves the installation, by attacker computers, of bots or other malicious software ("malware") on unsuspecting computers ("compromised computers") that are then employed by the attacker to carry out attacks on a third computer, often associated with a business, enterprise, or other institution. The mode of attack in which the attacker takes control of a compromised computer and uses it to initiate attacks on third computers can be difficult for security experts to fully remediate because of problems in identifying the ultimate attacker.

Present techniques to address the foregoing problem domain generally have been found to be ineffective, slow, or incomplete, so that improved solutions are needed.

SUMMARY

The appended claims may serve as a summary of the invention.

BRIEF DESCRIPTION OF THE DRAWINGS

In the drawings:

FIG. 2B illustrates other aspects of the process of FIG. 2A;

DETAILED DESCRIPTION

Figure 1:
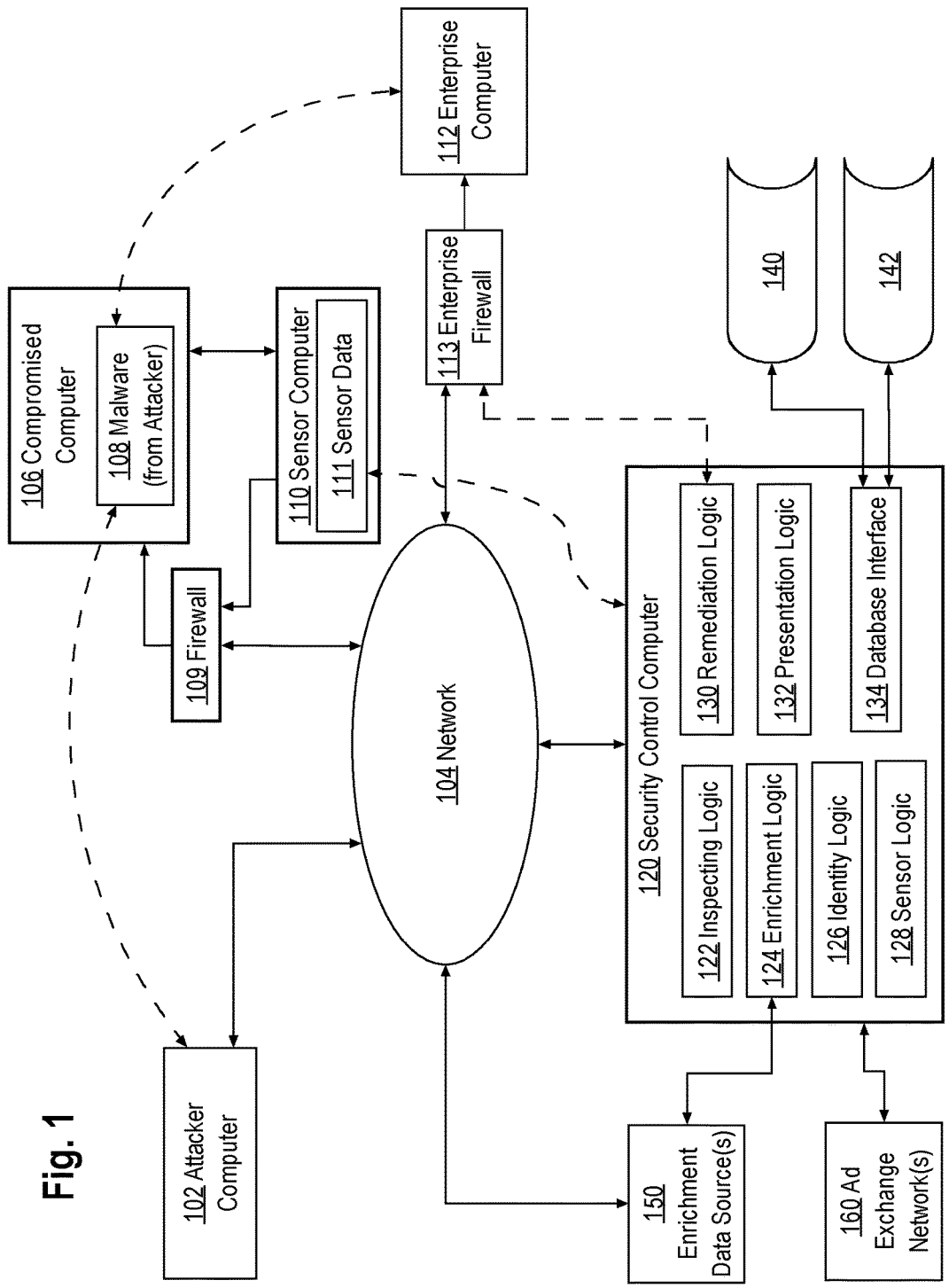
FIG. 1 illustrates a computer networking environment featuring a security control computer and one or more sensor computers located near compromised computers.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Network Topology
3.0 Process Overview
4.0 Implementation Mechanisms—Hardware Overview
5.0 Remediation of Security Threats
6.0 Other Aspects of Disclosure 1.0 General Overview In an embodiment, a data processing method providing an improvement in computer security comprises selecting, from a queue identifying a plurality of web pages, a particular web page to retrieve from one of a plurality of internet sources; causing retrieving a copy of the particular web page from a particular internet source; determining a hierarchical structure of the particular web page; based upon a hierarchical structure of the particular web page and without consideration of content of the particular web page, identifying one or more features, of links in the particular web page or files referenced in the particular web page, that indicate one or more security threats; determining a reputation score for the particular web page; determining a specified remediation measure, based upon the reputation score, to remediate a security threat that is identified in the particular web page; providing the specified remediation measure to one or more of a compromised computer, a sensor computer and an enterprise computer.

In an embodiment, a data processing system comprises a plurality of sensor computers, each of which is coupled to different one among a plurality of compromised computers in geographically distributed locations, each of the compromised computers comprising at least one malware item that is configured to direct unauthorized network activity toward one or more enterprise networks or enterprise computers, wherein the compromised computers are logically between one or more attacker computers and the one or more enterprise networks or enterprise computers; a security control computer that is coupled to the sensor computers and configured with security logic which is configured when executed to perform: obtaining, from the sensor computers, detection data relating to network messages that the compromised computers emit, as the compromised computers emit the network messages; using the detection data, identifying one or more security threats that are indicated by the network messages; determining a specified remediation measure to remediate one or more of the security threats; providing the specified remediation measure to one or more of the compromised computer, the sensor computer and an enterprise computer.

In another embodiment, a data processing system providing an improvement in computer security comprises a plurality of sensor computers, each of which is coupled to different one among a plurality of compromised computers in geographically distributed locations, each of the compromised computers comprising at least one malware item that is configured to direct unauthorized network activity toward one or more enterprise networks or enterprise computers, wherein the compromised computers are logically between one or more attacker computers and the one or more enterprise networks or enterprise computers; a security control computer that is coupled to the sensor computers; one or more non-transitory data storage media in the security control computer storing security logic comprising one or more sequences of instructions which when executed cause the security control computer to perform: selecting, from a queue identifying a plurality of web pages, a particular web page to retrieve from one of a plurality of internet sources; causing retrieving a copy of the particular web page from a particular internet source; determining a hierarchical structure of the particular web page; based upon a hierarchical structure of the particular web page and without consideration of content of the particular web page, identifying one or more features, of links in the particular web page or files referenced in the particular web page, that indicate one or more security threats; determining a reputation score for the particular web page; determining a specified remediation measure, based upon the reputation score, to remediate a security threat that is identified in the particular web page; providing the specified remediation measure to one or more of a compromised computer, a sensor computer and an enterprise computer.

The mode of attack in which the attacker takes control of a compromised computer and uses it to initiate attacks on third computers can be difficult for security experts to fully remediate because of problems in identifying the ultimate attacker. When the attacker computer is located behind a firewall, or owned and operated by a malicious state actor, it may be practically impossible to identify the true actor. Further, the owner or operator of the compromised computer may be unaware that the malware is present on the system or used to initiate attacks against others. However, the target of the attack—such as a business enterprise—often can determine that it is under attack, and often can trace the source of the attack to a compromised computer. With information about the location of compromised computers, the techniques described herein can be deployed to provide effective means to block attacks on the enterprise computer and, additionally or alternatively, to remediate the compromised computers.

While each of the drawing figures illustrates a particular embodiment for purposes of illustrating a clear example, other embodiments may omit, add to, reorder, and/or modify any of the elements shown in the drawing figures.

2.0 Example Network Environment

Figure 3:
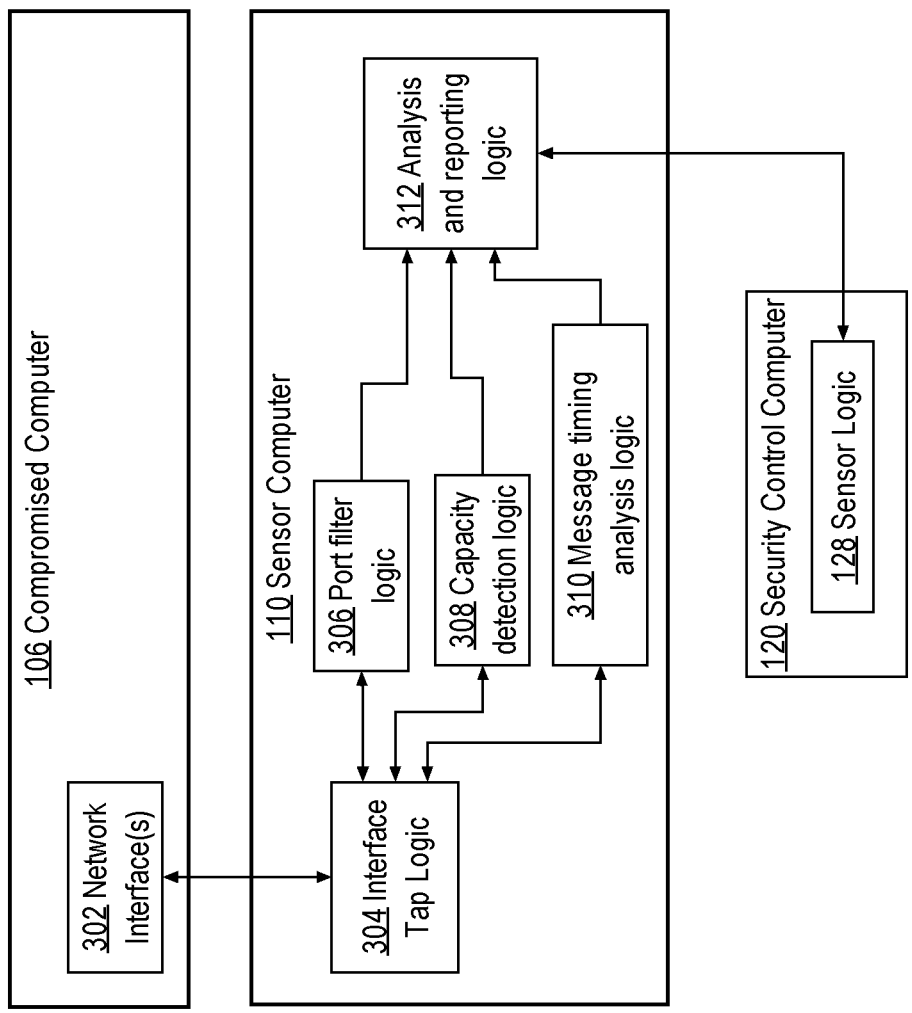
FIG. 3 illustrates an example of logical and functional elements of a sensor computer.
Figure 4:
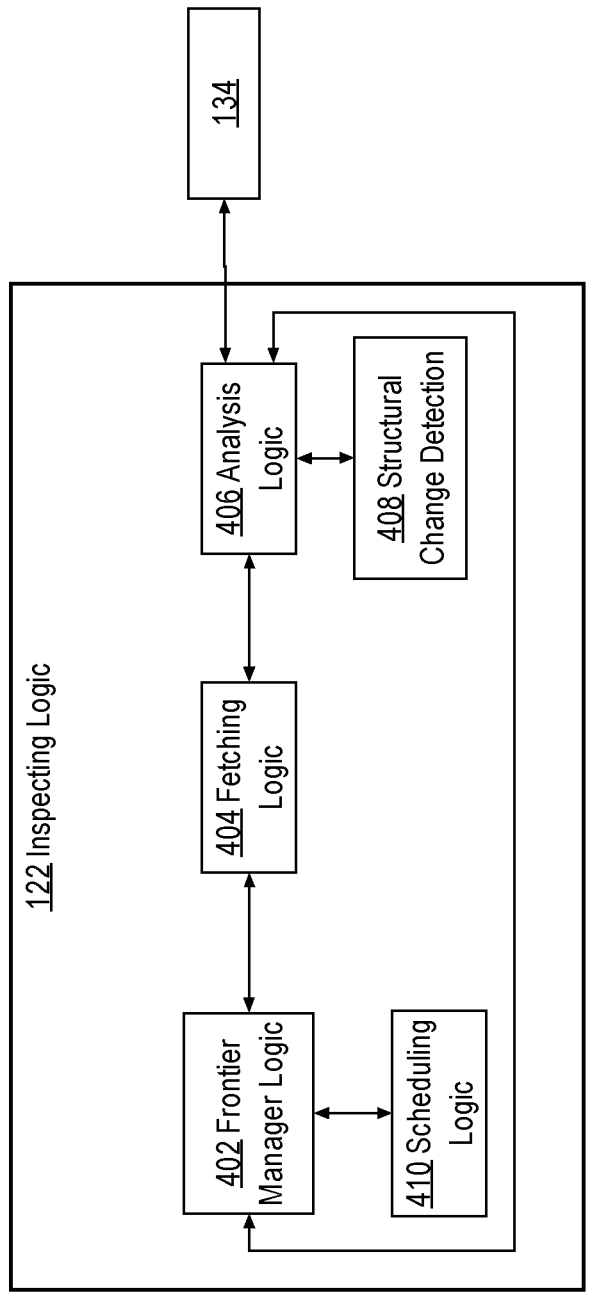
FIG. 4 illustrates a first example of logical and functional elements of inspecting logic.
Figure 6:
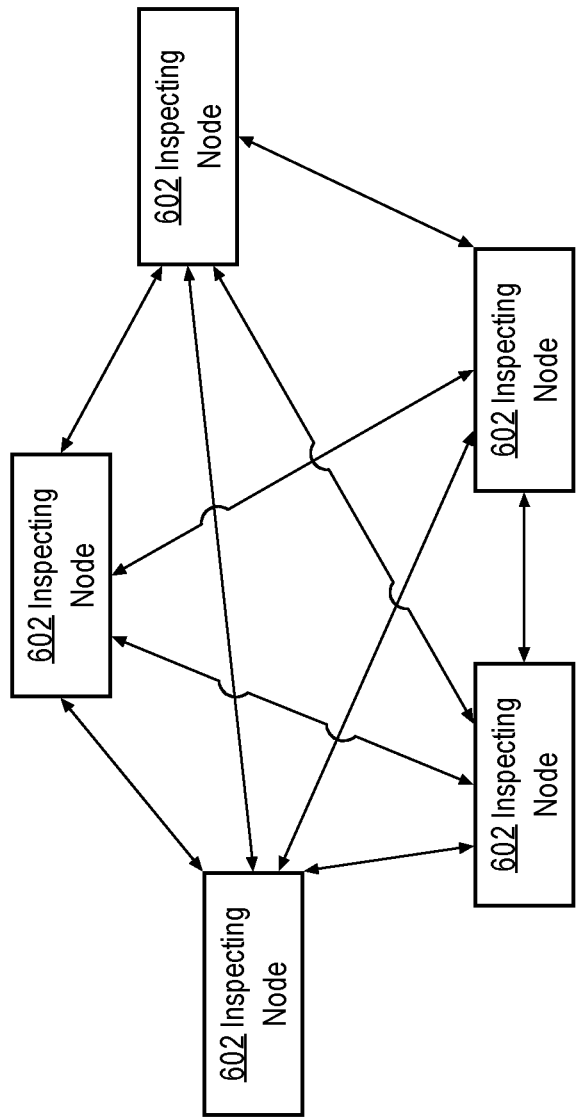
FIG. 6 illustrates a distributed network of inspecting nodes.
Figure 7:
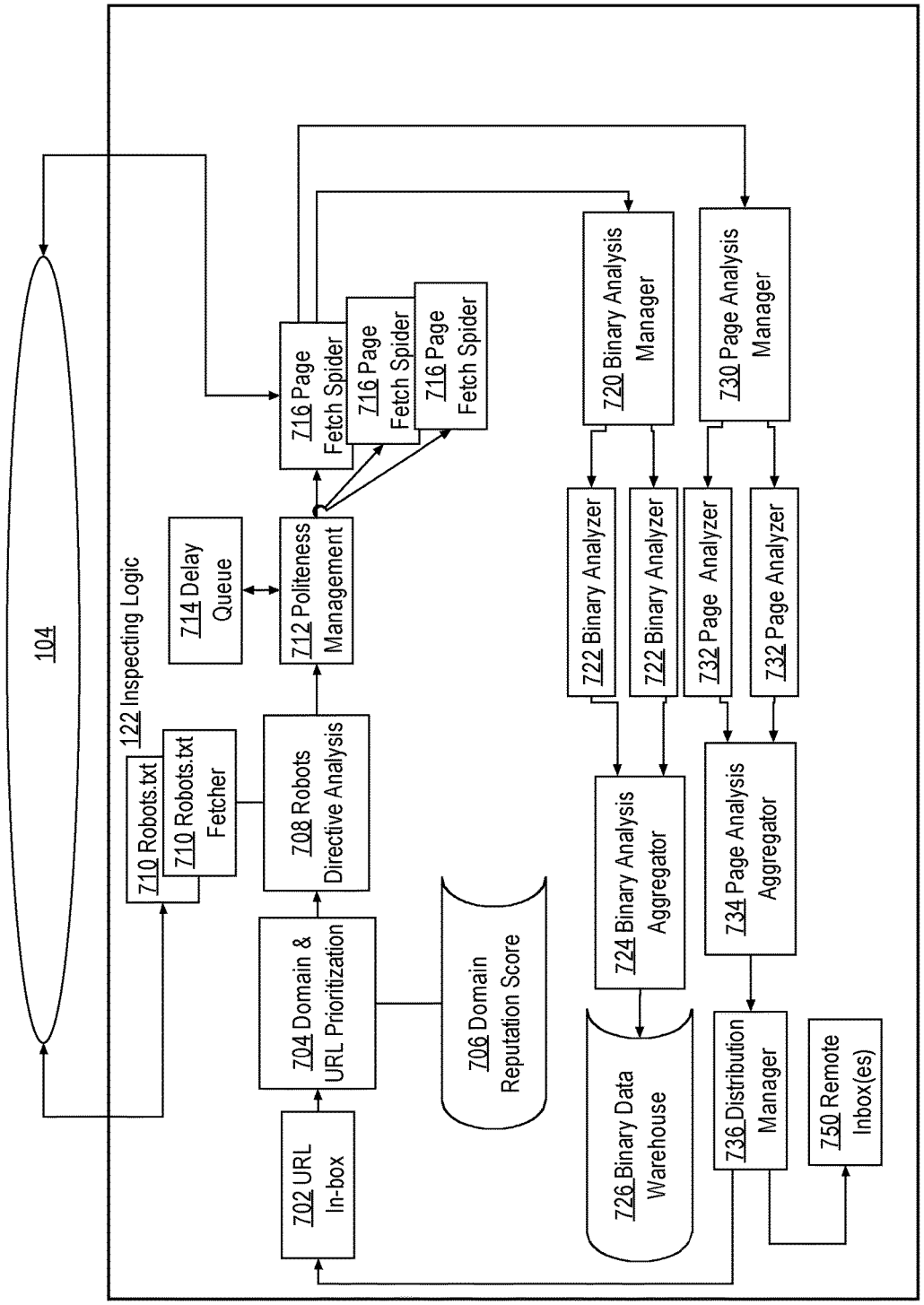
FIG. 7 illustrates a second example of logical and functional elements of inspecting logic.

FIG. 1 illustrates a computer networking environment featuring a security control computer and one or more sensor computers located near compromised computers; FIG. 3 illustrates an example of logical and functional elements of a sensor computer; FIG. 4 illustrates a first example of logical and functional elements of inspecting logic; FIG. 6 illustrates a distributed network of inspecting nodes; FIG. 7 illustrates a second example of logical and functional elements of inspecting logic.

Referring first to FIG. 1, in one embodiment, a networked environment may have as principal elements an attacker computer 102 coupled to a network 104, a compromised computer 104, a sensor computer 110, an enterprise computer 112, and a security control computer 120. Attacker computer 102 may be any computer that is ultimately used to initiate an attack, or the distribution of bots, other malware or viruses, and may be located within the same geographic region as other elements of FIG. 1 or in a different region. The attacker computer 102 may be used by, owned by, operated by, or located within a malicious state actor, such as within one of several countries of the world that are regularly associated with initiation of attacks apparently on behalf of the government or military organization of those states, but the presence of a state actor in the networked environment of FIG. 1 is not required in all embodiments.

Network 104 comprises one or more local networks, wide area networks, and/or internetworks and may comprise the public internet in whole or in part. In an embodiment, the compromised computer 106 hosts or executes malware 108 that was previously obtained from or installed by the attacker computer 102 as indicated by a broken line in FIG. 1 indicating a logical connection of the attacker computer to the compromised computer. The compromised computer 106 may be coupled to network 104 indirectly through a firewall 109 that is typically co-located with the compromised computer. The compromised computer 106 also may host a browser, as further described herein. The compromised computer 106 may be a server computer of an enterprise that services file requests or serves web pages to one or more users of the enterprise. Thus, compromised computer 106 may broadly represent two or more computers within an enterprise, one or more of which is compromised, and/or one or more of which accesses or uses the computer for another purpose.

In an embodiment, sensor computer 110 is deployed physically near or at least in the same LAN segment as the compromised computer 106 and logically behind the firewall 109. Sensor computer 110 is coupled to compromised computer 106, and/or firewall 109, and configured as a network tap to enable the sensor computer to receive and inspect all packets or other data communications that the compromised computer sends or receives. For example, sensor computer 110 is configured to obtain copies of all packets arriving from network 104 and directed to the compromised computer 106 on any interface of the compromised computer, and originating from the attacker computer, a third party web site, or any other data source. Typically the sensor computer 110 obtains packets from the compromised computer 106 in a transparent manner without affecting transit of the packets; however, as described further herein, the sensor computer also may be configured to reconfigure the firewall 109 to block transmission of certain packets, and/or to queue or otherwise prevent transit of packets in a form of packet shoot-down.

In an embodiment, as sensor computer 110 receives and inspects packets directed to the compromised computer 106, the sensor computer creates and stores sensor data 111 that describes aspects of the packets, attacks, or related metadata. In an embodiment, the sensor data 111 is locally stored at the sensor computer and periodically forwarded to the security control computer 120; for example, the sensor computer may serve as a local cache that is periodically flushed to the security control computer for persistent storage in one of the databases 140, 142.

The sensor computer 110 typically is used, owned and operated by an entity different than that of compromised computer 106; for example, the sensor computer may be owned or operated by a security organization or enterprise that also owns, operates or uses the security control computer 120, as indicated by a broken line in FIG. 1 indicating a logical connection between sensor computer 110 and security control computer 120.

Placement of sensor computers 110 may be performed by identifying malicious activity at a central location and tracing the activity to a particular compromised computer, then contacting the owner of that computer and reaching an agreement to place a sensor computer 110 coupled to that compromised computer. For example, the owner could be paid a research fee to permit local inspection of traffic to or from the compromised computer. The identification may use a variety of techniques including following malicious traffic from an available computer toward other computers that are compromised without the knowledge of their owners or operators, seed programs, malware reverse-engineering, and so forth.

Functions of sensor computers 110 generally may include filtering on ports of interest such as remote desktop protocol; RTP; SSL; SFTP; FTP; and others; detecting when message output or packet output reaches a certain capacity; detecting session construction for sessions with other computers; and analysis of intervals of times of day when messages are sent or when certain ports are used in packets. In all these examples, passive monitoring of traffic on ports is performed, data is stored locally on the sensor computer 110 and then periodically data is sent in reports to the security control computer. The data also can be fingerprinted to create signatures of observed packet patterns. Data collection at sensor computers 110 also may comprise collecting usernames or e-mail addresses from phishing emails that a particular user clicks through; the username can be used to more finely correlate a particular bad set of data with a particular user, rather than a particular machine.

For the purpose of illustrating a clear example, FIG. 1 shows a single sensor computer 110 coupled to a single compromised computer 106. However, in other embodiments, there may be any number of sensor computers 110 deployed in geographically distributed locations and associated with many different compromised computers that are owned and operated by different parties. Thus, this disclosure specifically contemplates the deployment of a large, widespread, geographically distributed overlay network consisting of large numbers of sensor computers 110, all reporting data to and interoperating with one or more security control computers 120 that manage and control the sensor computers, where each of the sensor computers is co-located with a different compromised computer in a different location. The compromised computers may be owned by, operated by, or used by completely different and unrelated companies, enterprises, institutions or other parties, and may have been compromised by any number of different attacker computers 102 at different times. Additionally or alternatively, two or more of the compromised computers may be at the same physical location or in the same general geographic region, such as a store, campus or territory, and coupled to a single sensor computer 110 or multiple different sensor computers.

In an embodiment, network 104 also is coupled through an enterprise firewall 113 to the enterprise computer 112. Because the enterprise computer 112 is coupled to the network 104, the malware 108 in compromised computer 106 may initiate one or more attacks on the enterprise computer, as indicated by a broken line in FIG. 1 indicating a logical connection between the malware and the enterprise computer. Attacks on enterprise computer 112 may include any known form of computer attack, intrusion or investigation that is now know, or equivalents thereof, including but not limited to: denial or service (DoS) attacks; installation of viruses, spam or adware; password harvesting.

In an embodiment, security control computer 120 comprises inspecting logic 122, enrichment logic 124, identity logic 126, sensor logic 128, remediation logic 130, presentation logic 132, and one or more database interfaces 134 that are coupled to one or more databases 140, 142. While each of the components listed above are illustrated as separate, in other embodiments one or more of the components listed above may be part of and/or executed using the same logic. The general configuration and functions of the logical elements of security control computer 120 include:

inspecting logic 122: determining web pages to inspect for security threats; loading the web pages using a headless HTTP browser or the equivalent; analyzing the structure of the web pages independent of content and inspecting links and page references in the structure; determining a reputation score and remediation measures for the web pages;

enrichment logic 124: querying one or more enrichment data sources 150 to obtain other information about web pages for the purpose of assisting the identification of threats and the determination of a reputation for the web pages;

identity logic 126: determining the identity of apparent attackers, based upon analysis of advertising network information, packets obtained from the sensor computer 110 or the enrichment sources; determining the identity of other compromised computers that may need investigation or the installation of other sensor computers;

sensor logic 128: interfacing to one or more of the sensor computers 110 to obtain sensor data 111 that is gathered and/or formed at the sensor computers and to provide the sensor data to other elements of the security control system or to databases 140, 142;

remediation logic 130: determining one or more remediation measures to implement via sensor computer 110 on firewall 109 or compromised computer 106, or on enterprise computer 112; distributing the remediation measures in the form of instructions or configuration data to any of the firewall, compromised computer, or enterprise computer;

presentation logic 132: forming one or more reports, graphs, or charts that report, explain, describe, show, aggregate or otherwise display the sensor data 111 and/or other information about security threats and remediation measures. For example, the open source project SPARK may be used to create graphs for visualization of links between nodes and associations of malware to links or nodes, with or without identification of people and machines that intersect with the links and nodes;

database interfaces 134: managing transfer of data to one or more databases 140, 142.

In an embodiment, databases 140, 142 comprise one or more of a domain reputation score database and a binary data warehouse. In one embodiment, the databases may be implemented using the CASSANDRA and/or HDFS open source projects. In various embodiments, the enrichment sources 150 may comprise global user browsing data indicating which web sites and web pages users are browsing on a global basis, reputation databases accessible through network requests, or other sources of metadata about security threats, web sites, or web pages.

In an embodiment, one or more advertising exchange networks 160 are communicatively coupled to security control computer and provide advertisement exchange network data that identifies computers and/or users based upon the delivery of advertisements through the networks to those computers, and other sources; this data may be consumed by the identity logic 126 to identify computers that may need inspection or that may need remediation.

The identity logic 126 may be configured to interface with the advertising exchange networks 160 for the purpose of identifying users or computers by listening on advertising exchanges for bids on advertisements. As an example, a website may serve varying advertisements based on interoperation with the advertising exchange networks 160 so that when a user computer requests a webpage, that request appears in the ad exchange and an algorithm considers available bids to determine which ad to serve in response to the request. The request may include all available demographic data and machine-related data based upon cookies on the user machine, browser fingerprint, type of site visited, or other sources such as account information. In an embodiment, the security control computer 120 is configured to always bid the lowest amount to the advertising exchange networks 160, which causes the networks to provide receive updates to the control computer of data for all other bids that are higher, and enables the control computer to receive the same demographic data about the user computer or account. Typically the data for a bid event includes: Cookie, IP from, destination, browser details, destination URL, time.

While these responses of the advertising exchange networks 160 normally are intended to enable a receiving computer to determine whether to bid higher, based upon information about who or what computer will receive an advertisement, in an embodiment, the security control computer 120 never bids higher but receives and uses the data for security purposes. For example, receiving such user profile data or computer profile data from the advertising exchange networks 160 effectively informs the security control computer 120 that a particular computer, or at least a profile of data about the computer in association with an IP address, visited a particular website, when, and where the user linked to the site from. This data may be correlated to stored mappings of IP addresses to particular companies or entities. Based on such mappings, the security control computer 120 can determine that the particular user at the company browsed to the particular website, which may be useful in remediation.

A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise.

A browser may be one or more computer programs or other software elements stored in electronic digital memory and executed on a computer that receives instructions from a server computer, performs one or more of the received instructions, causes to display content, provides a user interface ("UI") to receive user inputs, and/or receives and responds to one or more inputs from a user based on or according to the one or more performed instructions. A browser and/or components of a browser may be implemented into an application. For example, a browser and/or components of a browser may be implemented into a standalone, web-based, and/or mobile application as part of a web view, and/or web view controller, to send and/or receive data over HTTP, SPDY, and/or other protocol(s). A user may use a browser to send data to a server computer. The server computer may respond with additional instructions.

A page or web page may be a set of instructions that define one or more objects and/or operations that may be executed concurrently and may be visually displayed together. For example, in response to a request from a client computer, a "home page" may be sent to the client computer. The home page may be a set of instructions that a web server sends to a remote client computer if no parameters are included in the request. One page may reference and/or include other pages. For example, in response to a user selecting a link in a current page through a browser, the browser may request and receive a partial page. The partial page may be displayed in the interface currently displayed and defined by the current page.

An object may be a data structure that can be identified by an identifier and/or a relationship with another object, such as a link, form, button, image, field, input, and/or sub-page. For example, an object may have a unique identifier, which can be used to reference the object. An object may also be referenced by its position in a hierarchy of object.

An object may have one or more identifiers. For example, a link may be identified by a particular attribute in the link, such as a "name", "id", or "class" attribute. A link may be identified by an object that includes the link. For example, each link a division or section of a page may be identified by the division or section's identifier. Also for example, each link in a source page may be identified by the identifier for the source page, such as the uniform resource locator (URL) of the source page. One or more links may be identified by a target page. For example, each link in any page may be identified by the target page that the link points to. Additionally or alternatively, links may be identified by a combination of identifiers.

An attribute may be data that identifies and/or describes the appearance, behavior, and/or content of an object. For example, an attribute may be a unique identifier, such as a name. An attribute may indicate that an object is a type of text field, text area, checkbox, and/or radio button. Other attributes may define or describe dimension, position, color, visibility, value, and any other functional or visual aspect of an object.

A link may be an object that references a page or web page. The page referenced by the link may be referred to as a target page. A link may reference a target page by including a URL and/or other data that identifies a target page. A link may comprise one or more parameters. Additionally or alternatively, a link may comprise logic and/or instructions that are executed when the link is selected. Additionally or alternatively, a link may comprise and/or reference one or more objects that gather data and submit the data to a web server. For example, a link may reference a form. After data is entered into the form, and the link is selected, a request for a target page may be sent and the data in the form may be submitted with the request. The target page may comprise an error and/or success code. A target page need not include HTML, CSS, and JavaScript. Also for example, a link may comprise a form that references a target page. After data is entered into the form, and a submit button is selected, a request for the target page may be sent and the data in the form may be submitted with the request.

A link may be included in a page. The page the link is included in may be referred to as the source page. Additionally or alternatively, a link may be included in a short messaging service "text" message, instant message, email, and/or other medium.

Figure 5:
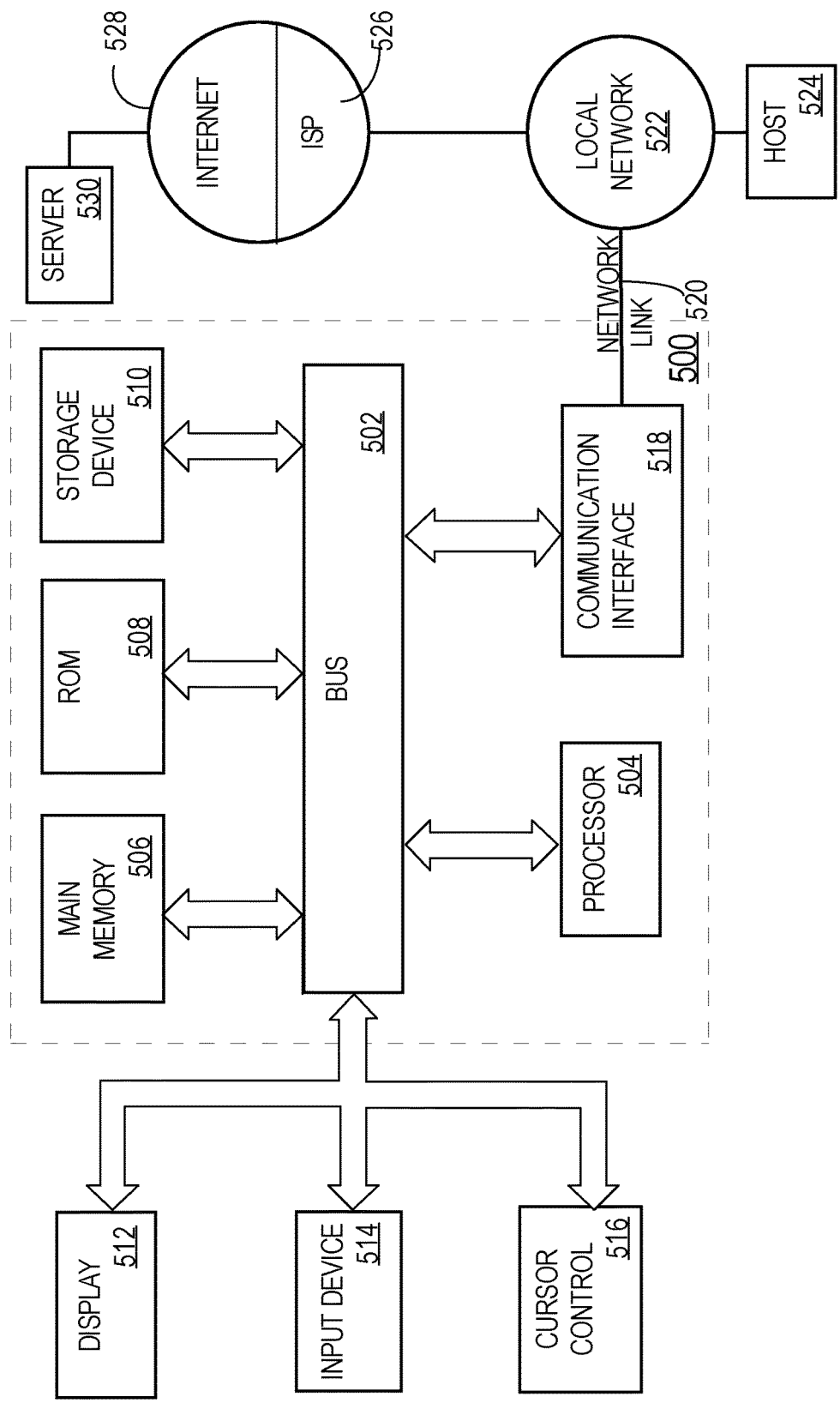
FIG. 5 is a block diagram that illustrates a computer system upon which an embodiment of the invention may be implemented.

In an embodiment, each of the functional units of security control computer 120 and sensor computer 110 may be implemented using any of the techniques further described herein in connection with FIG. 5; for example, the security control computer 120 may comprise a general-purpose computer configured with one or more stored programs which when executed cause performing the functions described herein for the intermediary computer, or a special-purpose computer with digital logic that is configured to execute the functions, or digital logic that is used in other computing devices.

Referring now to FIG. 3, in one embodiment, an example of logical and functional elements of a sensor computer 110 may comprise interface tap logic 304, which is coupled to port filter logic 306, capacity detection logic 308, and message timing analysis logic 310. Sensor computer 110 also may comprise analysis and reporting logic 312 that is coupled to outputs of the port filter logic 306, capacity detection logic 308, and message timing analysis logic 310. In one embodiment, the interface tap logic 304 is coupled to one or more network interfaces 302 of the compromised computer 106 and configured to transparently or promiscuously receive copies of packets that arrive at the network interfaces from other sources.

In this configuration, the interface tap logic 304 may obtain copies of the packets and queue them for inspection by one or more of the port filter logic 306, capacity detection logic 308, and message timing analysis logic 310 without otherwise affecting transit or forwarding of the packets to or within the compromised computer. This approach permits altering data flow to an enterprise computer while packets emitted from the compromised computer are inspected.

In an embodiment, port filter logic 306 is configured to filter the received packets on particular ports of interest; that is, the port filter logic drops or ignores all packets that do not include, in the TCP/IP 5-tuple for example, one of a set of particular port values that are often associated with attacks. Examples include port values for remote desktop protocol; RTP; SSL; SFTP; FTP. In an embodiment, the capacity detection logic 308 is configured to detect when the sensor computer 110 is sending a number of outbound packets toward enterprise computer 112, or toward other destinations, which exceeds a specified threshold that is associated with an attack vector. That is, certain attacks are known to be associated with causing a compromised computer to emit a large number of spurious, malicious, useless or unnecessary packets, and the capacity detection logic 308 is configured to determine when conditions indicate that an unreasonable number of packets is sent.

In an embodiment, the message timing analysis logic 310 is configured to detect when packets are sent at unreasonable times. For example, there may be bots or malware that is dormant during daylight hours but suddenly starts sending a flood of DoS packets, or other traffic, at 3:00 AM or other times during which computer usage is typically low. Configuration data associated with the message timing analysis logic 310 may vary operation and the detection of attacks according to a local environment, user base or context. For example, in hospitals, law enforcement, or other environments it may be reasonable for large traffic volume to occur at different times.

In an embodiment, analysis and reporting logic 312 is configured to perform local analysis of packets of interest, to detect potential attacks or packets of interest, and to provide reports of the analysis, or raw data, to the sensor logic 128 at security control computer 120. For example, the analysis and reporting logic 312 may manage periodically forwarding the sensor data 111 to the security control computer 120 as previously described.

In one embodiment, a function of the system of FIG. 1 is to inspect a large number of web pages and/or other electronic documents that are hosted in sources that are capable of browsing via network 104, to identify security threats represented in the web pages or documents and/or a security reputation of the web pages or documents, and to use information about the security threats to determine remediation measures that may be directed to one or more of the firewall 109, compromised computer 106, and enterprise computer 112. In an embodiment, inspecting web pages as described herein may encompass a large number of web pages, and even all web pages that are capable of browsing using the public internet. However, embodiments are not concerned with crawling, analyzing, or indexing the content of web pages or electronic documents; instead, the goal of inspection is to identify links and file references in the web pages, based upon web page structure independent of content. Thus, embodiments contemplate the implementation of a form of web browsing that is capable of operations which, given sufficient computing resources and time, are capable of identifying all possible security threats in all possible web pages based upon page structure, links and files and without regard to indexing substantive content such as text, images, links or files. While links or files are considered in the inspection operations and analysis, they do not need to be indexed; rather, they are used to develop reputation and threat information for storage in association with identifiers of pages.

Turning to FIG. 4, a first example of logical and functional elements of inspecting logic is shown. In the embodiment of FIG. 4, inspecting logic 122 of security control computer 120 (FIG. 1) may comprise frontier manager logic 402 that is coupled to provide output to fetching logic 404 and to receive input from scheduling logic 410, as well as analysis logic 406 that is coupled to receive input from fetching logic 404 and from structural change detection logic 408 and to provide output to database interface 134 for updating the databases 140, 142.

In an embodiment, in operation, frontier manager logic 402 is configured to determine the next web page to retrieve based upon any of several criteria such as links obtained from a prior page and timing. For example, in one embodiment input is received from scheduling logic 410 to determine whether a particular web page may be obtained from a particular web server or to adjust the timing of successive requests for different web pages from the same web server to prevent triggering throttling or other blocking efforts at the web server. In an embodiment, once the frontier manager logic 402 has determined which web page to retrieve and determined a time or schedule for retrieval, the frontier manager logic signals the fetching logic 404 to fetch the specified web page.

In an embodiment, if fetching logic 404 successfully retrieves a copy of a web page or other electronic document from a network resource, the fetching logic signals the analysis logic 406 to perform analysis of the page or document. In an embodiment, the analysis logic 406 generally is configured to compute a fingerprint such as a hash value for the web page, to determine a structural form of the web page, to traverse links in the web page, and to analyze file references in the web page, using techniques that are further described herein, in section 3 for example. In an embodiment, analysis logic 406 receives input from structural change detection logic 408 indicating whether a current structure of the web page is the same or different than the structure of the same web page as observed after a previous browsing or retrieval operation. The analysis logic 406 also is configured to store, via database interface 134 and using the databases 140, 142, the fingerprint value for the web page in association with a URL or other identifier, metadata describing the web page structure, reputation values, and information relating to threats, malware or attacks.

In an embodiment, analysis logic 406 also has an output path that provides input to frontier manager logic 402. In this configuration, inspecting logic 122 incorporates a feedback loop with which the analysis logic 406 may influence the frontier manager logic 402 with respect to the selection of the next web page for analysis. For example, the analysis logic 406 may determine that a set of links in the web page, if traversed, would result in an endless loop of redirection or retrieval operations that would effectively render operation of the fetching logic 404 impractical or impossible; in response, the analysis logic may instruct the frontier manager logic 402 that the set of links is "bad" and should be excluded from future fetching operations.

In one embodiment, the inspecting logic 122 may be implemented using a plurality of related but independently executed processing nodes. FIG. 6 illustrates a distributed network of inspecting nodes, in one example embodiment. A plurality of inspecting nodes 602 are coupled to one another in a fully meshed network. In one approach, each of the inspecting nodes 602 implements the inspecting logic 122 as previously described, executes in parallel with all other inspecting nodes, and operates with respect to a discrete and distinct set of web pages, links and/or files.

In one mode of operation, when a first inspecting node 602 identifies a new link in a web page that has been fetched, the first inspecting node determines, based upon a hash value of the link, which of the other inspecting nodes is responsible for processing that link or a web page located at that link. In an embodiment, the value space or hash space of all the hash values is segmented among the inspecting nodes 602 so that a particular range or segment of hash values is uniquely associated with a particular inspecting node. Therefore, a particular hash value always maps to the correct inspecting node that has responsibility for processing links within its mapped range of hash values. Consequently, determining a hash value for a link can result in rapid distribution of the link to a particular one of the inspecting nodes 602 for processing.

Moreover, there is no need to define lists of domains, network addresses, or other identifiers of web sites, domains, web pages, links and/or files for which each different inspecting node 602 has responsibility for processing. Instead, each of the inspecting nodes 602 can determine automatically, based upon a hash value or the equivalent for domains, network addresses, or other identifiers of web sites, domains, web pages, links and/or files, and a mapping of ranges of the value space to different ones of the inspecting nodes 602, which each different inspecting node 602 has responsibility for processing. Further, in response to identifying a new web page, link, or file, an inspecting node 602 may match an identifier to its local list before determining to pass the a new web page, link, or file to a different inspecting node 602.

FIG. 7 illustrates a second example of logical and functional elements of inspecting logic 122. In the embodiment of FIG. 7, a URL in-box 702 stores a queue of URLs representing the next web pages to browse and inspect. The URL in-box 702 is coupled to domain & URL prioritization logic 704, which is configured to periodically inspect the URL in-box and determine which domain(s) or URL(s) should be given different priority values; for example, associating a higher priority value with a particular URL effectively results in scheduling that particular URL for retrieval and inspection sooner. The domain & URL prioritization logic 704 may determine a priority value for a particular URL in whole or in part by retrieving a reputation value from a domain reputation score database 706, based upon the URL or a hash of the URL. In various embodiments, the database 706 may be one of the databases 140, 142, or may be part of one of the enrichment sources 150.

In an embodiment, a robots directive analysis unit 708 is coupled to the domain & URL prioritization logic 704 and to a plurality of robots.txt fetcher units 710, of which any number may be instantiated in various embodiments or execution scenarios. The robots directive analysis unit 708 is configured to request one of the fetcher units 710 to retrieve the "robots.txt" file from the web server associated with the next URL that has been assigned top priority in the URL in-box 702. In response to successfully retrieving the "robots.txt" file for a particular web server, the robots directive analysis unit 708 reads text of the file to determine how the target web server will respond to automated retrieval of pages at the website. Based upon this analysis, the robots directive analysis unit 708 instructs a politeness management unit 712 how to configure a delay queue coupled to the politeness management unit to order, manage or otherwise queue one or more particular web pages for retrieval from the same web server from which the "robots.txt" file was obtained. As a result, web pages will be retrieved from a particular web server without violating the directives in the "robots.txt" file, so that the inspecting logic 122 is not throttled or blocked by the target web server.

A plurality of page fetch spiders 716 are coupled to the politeness management unit 712. In one embodiment, the politeness management unit 712 periodically removes a URL from the delay queue 714 and passes it to an available page fetch spider 716, with a signal to retrieve the web page at the specified URL. If no page fetch spider 716 is available, then the politeness management unit 712 may instantiate another page fetch spider, subject to the amount of available computing resources such as memory and CPU.

Each page fetch spider 716 is configured to retrieve an HTML file representing a web page using the URL with which it was provided by the politeness management unit 712, and to provide a copy of the HTML file, or a handle identifying a memory or disk location of the HTML file, to a binary analysis manager 720 and a page analysis manager 730. In an embodiment, the binary analysis manager 720 is configured to analyze and determine reputation and threats associated with binary data sources such as executable files referenced within a web page, and the page analysis manager 730 is configured to analyze a page structure of the web page, independent of content, to identify links or files for further inspection or retrieval.

As seen in FIG. 7, each of binary analysis manager 720 and page analysis manager 730 is configured with a downstream pipeline comprising a plurality of processing units that may execute in parallel with respect to the same target web page that is undergoing inspection. Turning first to binary analysis manager 720, in one embodiment output from the binary analysis manager is coupled to one or more binary analyzer units 722, any number of which may be instantiated. The binary analysis manager may distribute identifiers of binaries of a particular web page to any one of the binary analyzer units based upon various load-sharing techniques such as round-robin distribution or size of the binary.

In an embodiment, output from each of the binary analyzer units 722 is coupled to a binary analysis aggregator 724 that receives and aggregates results of the analysis. For example, a first binary analysis unit 722 may analyze a first binary that is referenced in a particular web page, and a second binary analysis unit 722 may analyze a second binary that is referenced in the same particular web page, resulting in different reputation or threat scores for the two different binaries. In response, binary analysis aggregator 724 may determine an aggregated score for all binaries referenced in the particular web page. Aggregation may use arithmetic averaging, weighted scoring based upon the size of the binary or the domain reputation score that was earlier obtained from database 706, or other approaches. The resulting aggregated score value is provided to binary data warehouse 726, where the aggregated score value is stored in a record of a database table in association with an identifier of the binaries and/or an identifier of the web page.

Turning now to the page analysis manager 730, in one embodiment a plurality of page analyzer units 732 are coupled to the page analysis manager, which distributes one or more HTML documents, or handles or other references of locations in memory or disk for the HTML documents, to the page analyzer units. The page analysis manager 730 may distribute identifiers of a particular web page to any one of the page analyzer units 732 based upon various load-sharing techniques such as round-robin distribution or size of the web page.

Each page analyzer 732 is configured to perform structure-based analysis of the web page that was retrieved. In one approach, a document object model (DOM) tree structure of the web page is determined and the substantive content of the web page in terms of text, images or other elements is not considered. Analysis of DOM structure may include determining the number of links, the number of redirection operations that are triggered by traversing each link, whether the DOM structure has changed since a last retrieval of the same web page, or other factors. These analysis operations may result in generating a reputation score for the web page reflecting a likelihood that the web page conveys malware, contains script code to execute malicious operations, or otherwise represents a security threat.

In an embodiment, each page analyzer 732 provides output of the analysis, in terms of the reputation score of links and/or files in the page, and a set of other links to traverse to inspect other web pages, to a page analysis aggregator 734. In response, binary analysis aggregator 734 may determine an aggregated score for the web page structure, and an aggregated set of other links to traverse, based upon results of the individual page analyzer units inspecting the particular web page. Aggregation may use summation or concatenation for sets of links, and for reputation may use arithmetic averaging, weighted scoring based upon the size of the web page structure or the domain reputation score that was earlier obtained from database 706, or other approaches.

The resulting aggregated data is provided to distribution manager 736. In one embodiment, the distribution manager 736 is configured to provide the analysis data to one or more of two locations: the URL in-box 702, and/or one or more remote in-boxes 750. When the analysis data is provided to the URL in-box 702, a feedback loop is implemented with which the page analysis of units 730, 732, 734 may add new links or URLs to the queue for consideration for inspection in successive operations. Delivery of analysis data to remote in-boxes may be performed for any of several purposes, including distributing the analysis data to other instances of the security control computer 120; distributing the analysis data to a human analyst, for deeper inspection and/or correlation to other threats; distributing the analysis data to an intrusion detection system (IDS) or other automated threat analysis software, logic or hardware, for deeper inspection and/or correlation to other threats; and/or distributing the analysis data to one or more sensor computers 110 in the field for use in remediation.

3.0 Example Processes of Identifying and Remediating Network Security Threats

Figure 2A:
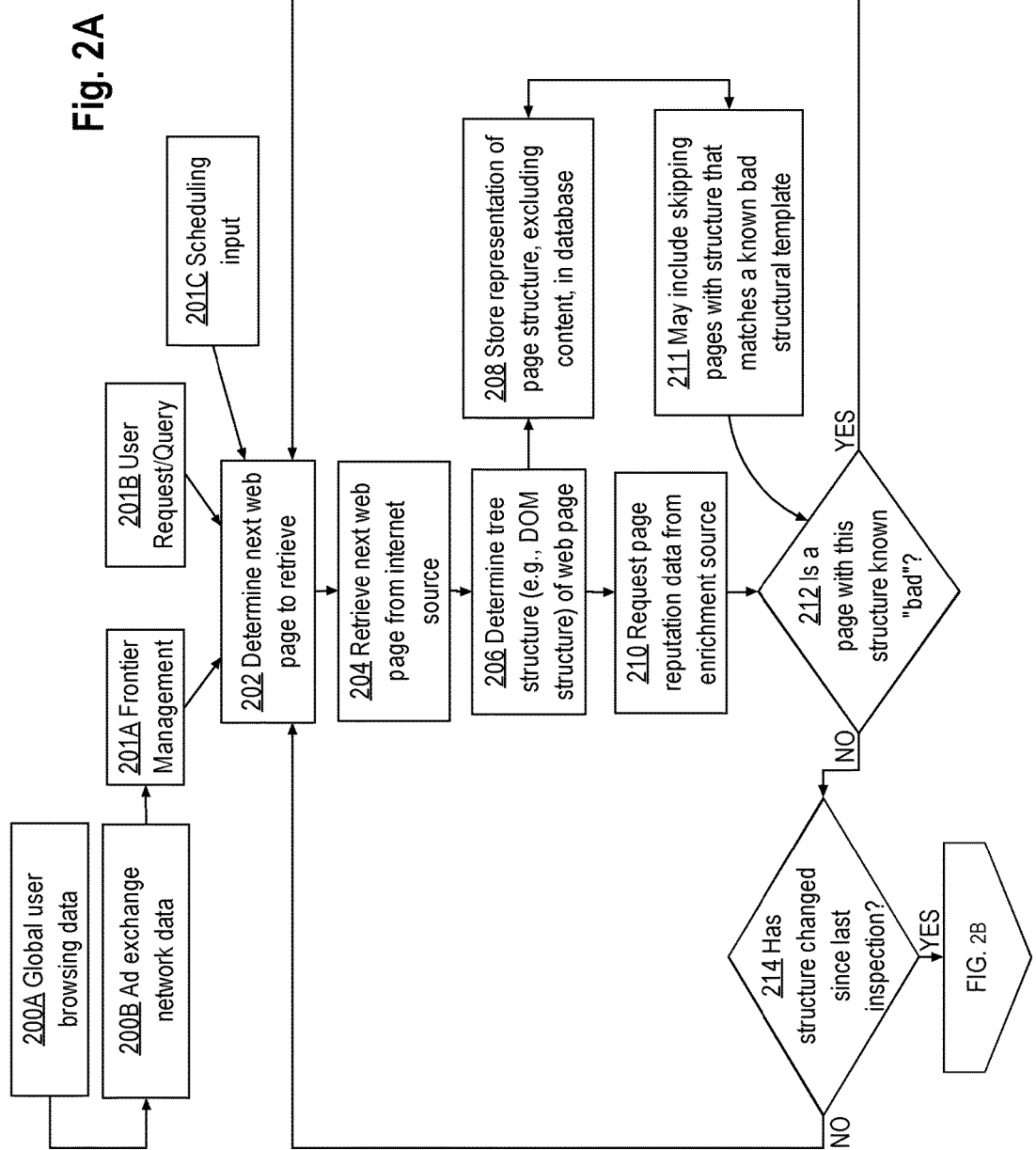
FIG. 2A illustrates a process of inspecting web pages for security threats.

FIG. 2A illustrates a process of inspecting web pages for security threats; FIG. 2B illustrates other aspects of the process of FIG. 2A. The processes of FIG. 2A, FIG. 2B may be implemented using the security control computer 120 and other elements of FIG. 1, in one embodiment. For example, the inspecting logic 122 may implement the process of FIG. 2A, FIG. 2B as described in this section and/or in combination with the functional descriptions of the inspecting logic that are provided in other sections. Thus, the flow diagrams of FIG. 2A, FIG. 2B will serve as a functional specification that a skilled person may use to write, debug, execute and otherwise program one or more computer programs, methods, algorithms using any suitable language or programming environment such as JAVA, C++, OBJECTIVE-C, C, PASCAL, or to design the gate structure, layout or programming of ASICS or FPGAs, or other logic, special-purpose computers or general-purpose computers loaded with stored programs.

Referring first to FIG. 2A, in one embodiment, at block 202, the process determines a next web page to retrieve. As seen in FIG. 2A, the determination at block 202 may be based upon input signals of many kinds, including global user browsing data 200A and ad exchange network data 200B received via frontier management unit 201A.

In various embodiments, the global user browsing data 200A may be obtained from third party sources via API calls or request URLs, and may indicate which web sites and web pages users are browsing on a global basis, reputation databases accessible through network requests, or other sources of metadata about security threats, web sites, or web pages. In an embodiment, ad exchange network data 200B may provide advertisement exchange network data that identifies computers and/or users based upon the delivery of advertisements through the networks to those computers, and other sources. Further, which web page to retrieve next may be specified in a request or query from a user computer that identifies a particular URL, as seen at block 201B, or based upon scheduling input 201C, as previously described for FIG. 3, FIG. 7. Thus, in various embodiments inspection of pages may occur in real time in immediate response to a trigger such as user input, ad network data or global browsing data, or periodically over time according to a schedule.

In an embodiment, frontier management unit 201A may be configured to determine a next web page to fetch based upon metadata obtained in relation to a previously fetched web page. For example, in one embodiment, frontier management unit 201A may be configured extracting, from a first web page, web page metadata comprising one or more of: a DNS name of a domain of a URL of the web page; an IP address of a web server that serves the first web page; a URL of the first web page; a source page containing a link that was used to retrieve the first web page; based upon the web page metadata, determining a plurality of second web pages to fetch and an order of fetching the plurality of second web pages.

At block 204, the process retrieves the next web page from an internet source such as a web server. At block 206, the process determines a tree structure of the web page; for example, the DOM structure may be determined. At block 208, the process stores a representation of the page structure, excluding page content such as text and images, in a database, such as database 140. Block 208 may include storing a hash value as an identifier of the web page and/or the structure, and may include storing an XML file specifying the DOM structure. Storing at block 208 may include skipping pages that have a structure that matches a template specifying a known bad structure. In other words, if enrichment sources 150 or local databases 140, 142 indicate that a particular page structure is already known to be "bad", then storing the structure is not necessarily needed.

At block 210, the process requests page reputation data from an enrichment source.

At block 212, the process tests whether the current web page has a structure that is known to be bad based upon the page reputation data that was retrieved at block 210. If the page structure is known to be bad, then control passes to block 202 at which the next page is processed. If the page structure is not known to be bad, then control transfer to block 214 at which the process tests whether the page structure has changed since the last inspection. The test of block 214 may include matching a hash value of the web page or its DOM structure to all hash values that are already stored in the database 140, using a SELECT query or other retrieval. If the web page structure has not changed as tested at block 214, then control passes to block 202 to consider the next web page; otherwise control transfers to FIG. 2B.

Referring now to FIG. 2B, at block 220, the process examines the web page to identify features that indicate malware or sources of attacks. Block 220 broadly represents the initiation of an inspection process that may include the steps of blocks 222, 226, 230, 234 and related processing, but also may include other operations; for example, block 220 could include performing a query to a reputation database based upon the URL of the web page, or a hash, to retrieve a stored reputation value for the web page, URL or domain associated with them.

At block 222, the process reviews each link in the web page. Reviewing a link may comprise programmatically invoking the link, equivalent to a user clicking on the link using a browser.

At block 224, to avoid endless loops caused by link farms in malicious web pages, the process computes a score for each redirection path that is associated with a link, and stores the score. If the score exceeds a specified threshold so that the link probably would result in thwarting operation of web pages inspection activities, then output from block 224 can mark links or update the databases to prevent traversal of the links in other inspection operations. For example, if virtually clicking on a link would cause a redirection eight (8) times before reaching an ultimate host, then a maliciousness score associated with the link may be increased or the link may be marked using a binary value indicating maliciousness or not to follow the redirections. This approach recognizes that links are normally not inherently malicious, but may lead a user browser or computer to something that is malicious, so the existence of loops or multiple redirects is of greater interest than the inherent content of the link or URL.

At block 226, the process inspects each file reference in the web page. Typically file inspection involves executables and ADOBE PORTABLE DOCUMENT FORMAT (PDF) files, which are capable of carrying executable script code; image files may be ignored, thereby relieving the inspection process of the burden of inspecting a large volume of internet content. As part of inspecting a file reference, at block 228, the process determines a status value for the file, such as Known Good or Known Bad, which may limit or influence other steps.

At block 230, the process determines a reputation score for the web page as a whole, and at block 232 the database is updated with the reputation score for the web page as a whole. Block 230 may involve obtaining reputation input from one or more of the enrichment data sources 150. Other attributes pertaining to files may be obtained from enrichment sources or local databases, including but not limited to certificate chain values, file size, path to the file, etc.

At this point the process optionally may determine an ultimate reputation score for the page as a whole. In one approach, the preceding steps result in storing various attributes for the page and then the attribute values are fed to a binary circuit decision tree that determines a final result. For example, when the ratio of redirects and IP reputation values are bad, then these two bad results cause following specified paths through the binary decision tree and may result in a bad label. This approach permits determining an ultimate reputation value for a page in a very fast manner once the attribute values are available from preceding steps. Further, if the system receives a request for information about a particular link, the tree can be run very fast for the stored attributes of that link to yield a result.

At block 234, the process combines the score with other data, such as location data indicating a geographic location of a compromised computer, and performs a remediation analysis. The remediation analysis at block 234 may result in one or more reporting operations at block 236, generating graphics or maps at block 238, and/or providing one or more updates at block 240 to an enterprise firewall, such as firewall 113 (FIG. 1). Thus the sensor computers may be used as network queues to alter data flow to the enterprise computers. For example, particular traffic that the compromised computer is emitting may be blocked. As other examples, the firewall or compromised computer may be reconfigured or instructed to drop packets or shoot down packets, disrupt the establishment of a TCP connection or UDP connection that is partway through handshake negotiation, and/or disrupt or tear down an existing connection session in the TCP/IP layers or application layers of the OSI reference model.

The operations of block 236, 238 may comprise generating and displaying data at a user computer or workstation that is coupled to security control computer 120 for the purpose of trend analysis, geographic analysis, or other reporting relating to threats. For example, risk reports relating to a particular enterprise computer 112 or compromised computer 106 may be generated that catalog all threats that have been identified. Other reports or graphics may indicate total attacks by geographic location, total attacks of different types by hour, day or other period; total attacks of all types across specified time intervals; heat maps that show the location of IP addresses known to the system with associated score values; risk profiles for an enterprise organized by department or other functional unit of the enterprise, based upon a mapping of IP addresses or other computer identifiers to business identifiers of departments or other functional units. Reports can indicate, for a particular attack, the computers associated with the attack and their locations; details of a file found in a web page that is associated with an attack; domains related to a domain that hosts the file and the reputation scores of those domains; files related to the first file and reputation or threat values associated with those files.

The techniques described herein offer numerous benefits and significant improvements over prior approaches or ideas. For example, the system architecture and processes disclosed herein are capable of identifying malicious cyber activity outside enterprise networks. As one particular example, the integration of ad network data can reveal which users of an enterprise, or users of compromised computers, are visiting malicious websites. No software needs to be installed on user systems, such as compromised computer 106, or in the enterprise, such as on enterprise computer 112. The techniques can operate in real time as threats develop, and are content-agnostic in terms of determining reputation scores for files and websites; the content of web pages has no influence on the reputation scores, and in fact the techniques herein recognize that the content of malicious web pages often is gibberish, useless, not meaningful or otherwise has no bearing on whether the DOM structure of a page includes links or file references that are malicious. The integration and use of user browsing data obtained from ad delivery networks and other sources, to indicate what web pages other users are browsing, causes the system herein to be user-driven. That is, the system is driven at least in part by actual user browsing behavior, and therefore the system can inspect and respond to web pages that are actually being browsed, rather than attempting to exhaustively inspect every page that is available through the public internet with no correlation to actual user browsing behavior. Exhaustive inspection can be performed as a long-term goal based upon available CPU and storage resources, but the integration of actual user browsing behavior data, from data sources such as ad networks that have not been used previously for security analysis, represents a significant advance over prior work in the network security area.

With the foregoing description, the disclosure herein has described the subject matter of the following numbered clauses:

1. A data processing method providing an improvement in computer security, comprising selecting, from a queue identifying a plurality of web pages, a particular web page to retrieve from one of a plurality of internet sources; causing retrieving a copy of the particular web page from a particular internet source; determining a hierarchical structure of the particular web page; based upon a hierarchical structure of the particular web page and without consideration of content of the particular web page, identifying one or more features, of links in the particular web page or files referenced in the particular web page, that indicate one or more security threats; determining a reputation score for the particular web page; determining a specified remediation measure, based upon the reputation score, to remediate a security threat that is identified in the particular web page; providing the specified remediation measure to one or more of a compromised computer, a sensor computer and an enterprise computer.

2. The method of clause 1, further comprising reviewing each link in the particular web page, computing a link score for each redirection path associated with that link, and determining the reputation score at least in part based upon the link score.

3. The method of clause 2, further comprising refraining from using a particular link to reach another web page referenced in the link when the link score is greater than a specified threshold that is associated with non-traversable links.

4. The method of clause 1, further comprising inspecting each of the files referenced in the particular web page, determining a status value for each of the files, and determining the reputation score at least in part based upon the status value.

5. The method of clause 1, further comprising determining the reputation score at least in part based upon combining the reputation score with one or more enrichment data sources.

6. The method of clause 1, further comprising determining the reputation score at least in part based upon combining the reputation score with one or more of geo-location data and one or more other enrichment sources.

7. The method of clause 1, further comprising performing the selecting based upon one or more of advertising exchange network bid data and feedback from analysis of previous web pages.

8. The method of clause 1, further comprising determining the reputation score for the particular web page, determining the specified remediation measure, and providing the specified remediation measure only when the hierarchical structure of the particular web page has not changed since a last inspection of the same particular web page.

9. The method of clause 1, wherein the steps of the method are performed using inspecting logic in a security control computer that is coupled through one or more networks to a sensor computer that is co-located with and coupled to a compromised computer, and further comprising providing the specified remediation measure only to the sensor computer.

10. The method of clause 1, wherein the steps of the method are performed using inspecting logic in a security control computer that is coupled through one or more networks to a sensor computer that is co-located with and coupled to a compromised computer that is coupled to a firewall that is configured to control ingress of packets to the compromised computer, and further comprising providing the specified remediation measure only to the firewall.

11. The method of clause 1, wherein the queue is coupled to inspecting logic that is configured to inspecting logic that is configured to store the plurality of web pages in the queue based upon input from one or more of: advertising exchange network bid data; global user browsing data indicating which web pages are the subject of browsing by a plurality of geographically distributed users; feedback from analysis of previous web pages by the inspecting logic; a user query; scheduling input.

12. A data processing system comprising: a plurality of sensor computers, each of which is coupled to different one among a plurality of compromised computers in geographically distributed locations, each of the compromised computers comprising at least one malware item that is configured to direct unauthorized network activity toward one or more enterprise networks or enterprise computers, wherein the compromised computers are logically between one or more attacker computers and the one or more enterprise networks or enterprise computers; a security control computer that is coupled to the sensor computers and configured with security logic which is configured when executed to perform: obtaining, from the sensor computers, detection data relating to network messages that the compromised computers emit, as the compromised computers emit the network messages; using the detection data, identifying one or more security threats that are indicated by the network messages; determining a specified remediation measure to remediate one or more of the security threats; providing the specified remediation measure to one or more of the compromised computer, the sensor computer and an enterprise computer.

13. The system of clause 12, further comprising providing the specified remediation measure only to the sensor computer, wherein the sensor computer is configured, in response to receiving the specified remediation measure, to reconfigure a firewall to which the compromised computer is coupled using firewall instructions that are based upon the specified remediation measure.

14. The system of clause 12, further comprising, based upon the detection data, creating and causing displaying, in a user interface of a computer display device, one or more reports specifying a plurality of attacks directed toward the enterprise network or enterprise computer.

15. The system of clause 12, further comprising: obtaining, from one or more enrichment services, based upon network addresses in the network messages, geo-location data indicating a particular geographic location; creating and causing displaying, in the user interface, an aggregate number of attackers in the particular geographic location that have initiated attacks toward the enterprise network or enterprise computer.

16. The system of clause 12, further comprising: receiving, from one or more advertising exchange networks, advertising presentation data indicating presentations of advertisements to particular browsers that have browsed to particular websites; determining, based upon the detection data, whether the particular websites are associated with network attacks and/or malware; in response to the determining, storing transit data specifying computers that have visited the particular websites and using the transit data to determine a plurality of particular web pages to inspect for threats.

17. The system of clause 12, further comprising: using the sensor computer, selecting one or more of the network messages emitted from the compromised computer and directed toward the enterprise computer; queuing the selected one or more of the network messages in queues at the sensor computer; inspecting and modifying the queued one or more network messages to remove one or more security threats before forwarding the queued network messages to the enterprise computer.

18. The system of clause 17 wherein the selection comprises filtering the one or more network messages emitted from the compromised computer based upon one or more ports of interest.

19. The system of clause 17 wherein the selection comprises selecting all network messages when a total message output or packet output of the compromised computer exceeds one or more specified thresholds.

20. The system of clause 12, wherein the security control computer further comprises inspecting logic that is configured to perform: selecting, from a queue identifying a plurality of web pages, a particular web page to retrieve from one of a plurality of internet sources; causing retrieving a copy of the particular web page from a particular internet source; determining a hierarchical structure of the particular web page; based upon a hierarchical structure of the particular web page and without consideration of content of the particular web page, identifying one or more features, of links in the particular web page or files referenced in the particular web page, that indicate one or more security threats; determining a reputation score for the particular web page; determining a specified remediation measure, based upon the reputation score, to remediate a security threat that is identified in the particular web page; providing the specified remediation measure to one or more of the compromised computer, the sensor computer and the enterprise computer.

21. The system of clause 20, wherein the inspecting logic is further configured to review each link in the particular web page, compute a link score for each redirection path associated with that link, and determine the reputation score at least in part based upon the link score.

22. The system of clause 21, wherein the inspecting logic is further configured to refrain from using a particular link to reach another web page referenced in the link when the link score is greater than a specified threshold that is associated with non-traversable links.

23. The system of clause 20, wherein the inspecting logic is further configured to inspect each of the files referenced in the particular web page, determine a status value for each of the files, and determine the reputation score at least in part based upon the status value.

24. The system of clause 20, wherein the inspecting logic is further configured to determine the reputation score at least in part based upon combining the reputation score with one or more enrichment data sources.

25. The system of clause 20, wherein the inspecting logic is further configured to determine the reputation score at least in part based upon combining the reputation score with one or more of geo-location data and one or more other enrichment sources.

26. The system of clause 20, wherein the inspecting logic is further configured to perform the selecting based upon one or more of advertising exchange network bid data and feedback from analysis of previous web pages.

27. The system of clause 20, wherein the inspecting logic is further configured to determine the reputation score for the particular web page, determine the specified remediation measure, and provide the specified remediation measure only when the hierarchical structure of the particular web page has not changed since a last inspection of the same particular web page.

28. The system of clause 20, wherein the inspecting logic is configured to store the plurality of web pages in the queue based upon input from one or more of: advertising exchange network bid data; global user browsing data indicating which web pages are the subject of browsing by a plurality of geographically distributed users; feedback from analysis of previous web pages by the inspecting logic; a user query; scheduling input.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

5.0 Remediation of Security Threats

Various remediation measures can be implemented by, for example, the sensor computer 110. The sensor computer 110 can generate and send an action packet to the compromised computer 106 that terminates an established communication connection or attempted communication connection between the compromised computer 106 and the enterprise computer 112. In an embodiment, sensor computer 110, via a network tap configuration, receives communication packets sent by the compromised computer 106. The sensor computer 110 determines whether an enterprise computer 112 is targeted by the compromised computer 106. If an enterprise computer 112 is the target, then the sensor computer 110 generates an action packet that appears to be from the enterprise computer 112 and that causes connection between the compromised computer 106 and the enterprise computer 112 to be slowed or stopped. The action packet appears to be from the enterprise computer 112 by virtue of having header fields that match those of the communication packet sent by the compromised computer 106. Specifically, because the sensor computer 110 is co-located with the compromised computer 106, TCP/IP or UDP headers in packets sent by the compromised computer 106 can be accessed and duplicated by the sensor computer 110.

Figure 8:
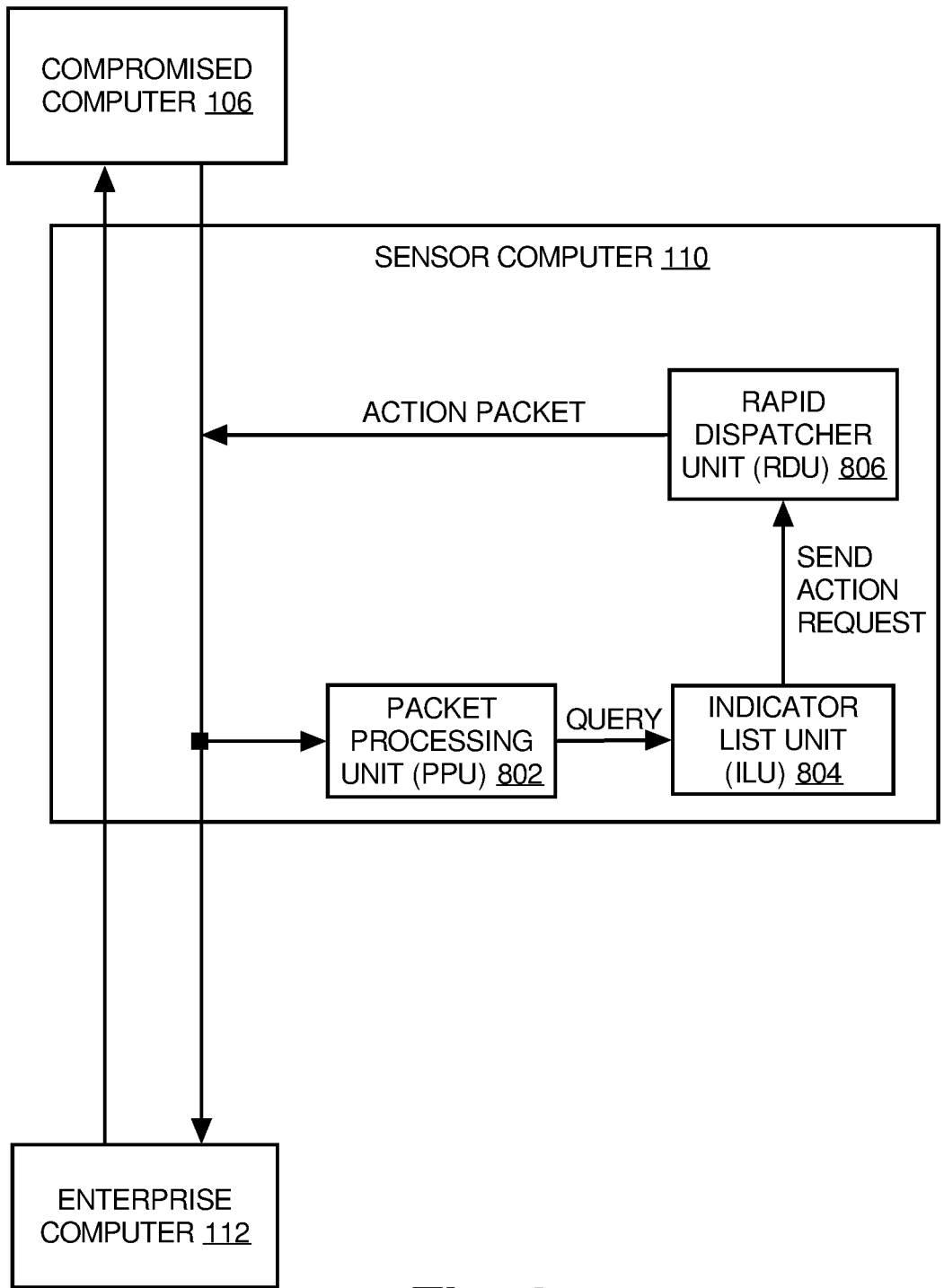
FIG. 8 illustrates a computer networking environment featuring a sensor computer co-located with a compromised computer.

FIG. 8 illustrates a computer networking environment featuring a sensor computer 110 co-located with a compromised computer 106. The compromised computer 106 has a public IP address and is in communication with an enterprise computer 112. As depicted in the environment of FIG. 1, the sensor computer 110 and the compromised computer 106 can be logically behind a firewall such as the firewall 109 of FIG. 1. In some instances, a TCP/IP or UDP connection is in the process of reaching the established state through a handshake negotiation or has been established between the compromised computer 106 and the enterprise computer 112.

Figure 9:
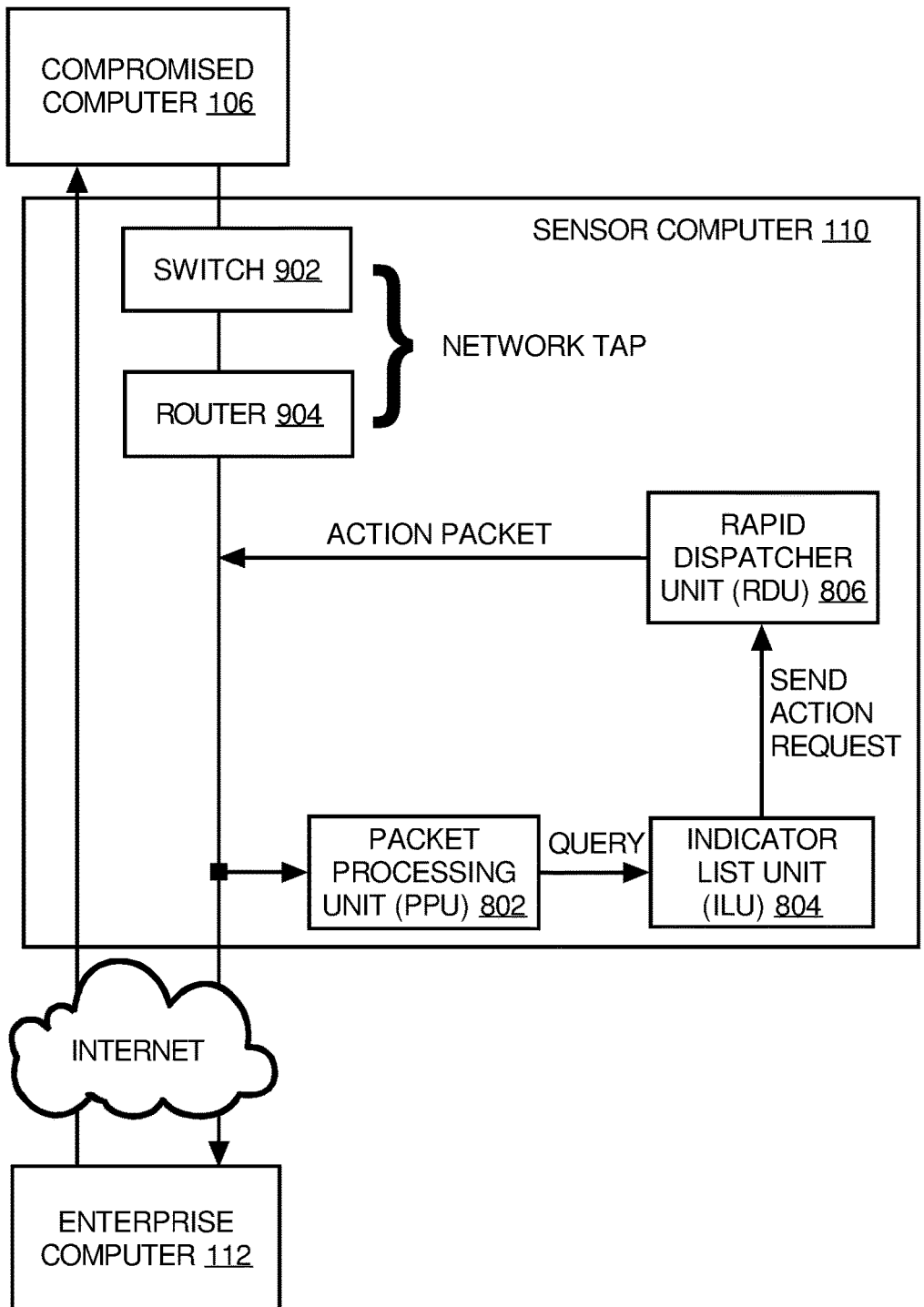
FIG. 9 illustrates a computer networking environment including an example implementation of interface tap logic.

In an embodiment, sensor computer 110 comprises a packet processing unit (PPU) 802, an indicator list unit (ILU) 804, and a rapid dispatcher unit (RDU) 806. The PPU 802 is configured to receive, via a network tap configuration, copies of packets sent by the compromised computer 106. The network tap can include the interface tap logic 304 of FIG. 3. An example embodiment of a network tap is depicted in FIG. 9. The shown network tap comprises hardware components such as a switch 902 and a router 904. FIG. 9 further depicts the sensor computer 110 being co-located with the compromised computer 106 by virtue of positioning the network tap logically between the compromised computer 106 and the Internet.

Returning to FIG. 8, the PPU 802 reads the headers of the packets or segments received from the compromised computer 106 via the network tap. By virtue of being co-located with the compromised computer 106, the header fields of the sent packets are visible to the sensor computer 110. The headers are read to identify an IP address of a target computer to which the packet or segment is sent. The PPU 802 generates a query with the IP address of the target computer and sends the query to the ILU 804.

Upon receiving the query, the ILU 804 determines whether target computer is one of a plurality of enterprise computers that includes the enterprise computer 112. The ILU 804 compares the IP address included in the query to IP addresses of the plurality of enterprise computers. The IP addresses of the plurality of enterprise computers are stored in a data structure at the sensor computer 110 or at another computer, such as the security control computer 120 or in the database 140 and/or 142 of FIG. 1. Any of several kinds of data structures can be used to store the IP addresses of the plurality of enterprise computers, including but not limited to, arrays, hash tables, and sets. In other embodiments, the intended recipient of the sent data packet can be identified using identifiers or descriptors other than an IP address.

If the target computer to which the packet or segment is sent is not one of the plurality of enterprise computers (e.g., the enterprise computer 112), then the ILU 804 instructs the sensor computer 110 to take no further action, allowing the compromised computer 106 to communicate freely with the target computer.

If the target computer to which the packet or segment is sent is one of the plurality of enterprise computers (e.g., the enterprise computer 112), then the ILU 804 is configured to generate and send an action request instructing the RDU 806 to generate an action packet.

The RDU 806 is configured to generate an action packet and send the action packet to the compromised computer 106. The action packet, when received and processed by the compromised computer 106, causes the compromised computer 106 to stop or slow communication with the enterprise computer 112 via one or more remediation measures.

The action packet is a TCP or UDP packet or segment and can have a header and a payload. The header of the action packet is generated by duplicating fields from the communication packet sent by the compromised computer 106. Thus, the action packet appears to have been sent by the enterprise computer 112 in response to the communication packet. The enterprise computer 112 can still receive the communication packet but, because the compromised computer 106 receives and processes an action packet from the sensor computer 110, the compromised computer 106 does not send subsequent packets to the enterprise computer 112.

Examples of remediation measures involve modifying some fields in the header of the action packet to cause a three-way handshake to initiate a TCP connection to fail. The three-way handshake is initiated by enterprise computer 112 once the compromised computer 106 has a passive open connection at the enterprise computer 112. The enterprise computer 112 completes the three-way handshake by sending an ACK segment to the compromised computer 106 in response to a SYN-ACK segment received from the compromised computer 106.

In some embodiments, the sensor computer 110 receives the SYN-ACK segment via the network tap. The RDU 806 generates action packet, and specifically, an RST segment by duplicating some of the header field so that the RST segment appears to have been sent by the enterprise computer 112. The RST segment causes the compromised computer 106 to reset the connection.

In some instances, however, the RST segment will be interpreted as a "spurious reset" by the compromised computer 106, causing the compromised computer 106 to disregard the RST segment in implementations that conform to the standard TCP protocol specification. To prevent the compromised computer 106 from disregarding the action packet, instead of an RST segment, in an embodiment, the action packet sent can include an ACK segment having an unexpected sequence number, which may be termed as a "bogus ACK". The unexpected sequence number is out-of-sequence relative to a sequence number that was sent in a SYN segment in the beginning of the three-way handshake; that is, the sequence number is out-of-sequence in relation to past sequence numbers that have been sent on the connection. The unexpected sequence number is, in some instances, less than the sequence number included in the SYN segment and greater than a sequence number included in a previous ACK segment.

In some instances, the action packet is an ACK segment having a FIN bit set. The set FIN bit causes the compromised computer 106 to close the TCP connection with the enterprise computer 112.

In other instances, a duplicate ACK can be sent to the compromised computer 106 during the three-way handshake. The duplicate can effect a reset of the connection. If the duplicate ACK is sent after the connection is established, its receipt by the compromised computer 106 can trigger error handling protocols that slow communication with the enterprise computer 112.

In embodiments where a TCP connection between the compromised computer 106 and the enterprise computer 112 is already in the ESTABLISHED state, the header of the action packet can be generated to include a sequence number that is out-of-sequence in relation to the TCP connection.

In some embodiments, the header of the action packet is populated normally but the payload of the packet is generated in a way that will disrupt a TCP connection or UDP connection. UDP connections often are used for streaming content or for Voice Over IP (VOIP) content. In some embodiments, the generated payload of the action packet is a duplicate of a previously sent packet. In other embodiments, the generated payload comprises munged data generated by transforming a payload of the communication packet. The duplicate and munged payloads can effectively render the data received by the compromised computer 106 unreadable.

In some embodiments, the sensor computer 110 can detect a domain name service (DNS) query sent by the compromised computer 106. The PPU 802 reads the domain name in the DNS query and sends a query to the ILU 804 including the domain name in the DNS query. If the domain name is the domain name of the enterprise computer 112, then the ILU 804 generates and sends an action request to the RDU 806. The RDU 806 generates an action packet using duplicated fields from the DNS query that appears to the compromised computer 106 to be a DNS reply from a DNS server. In contrast to an actual DNS reply, the action packet generated by the RDU 806 can include an invalid IP address.

Figure 10:
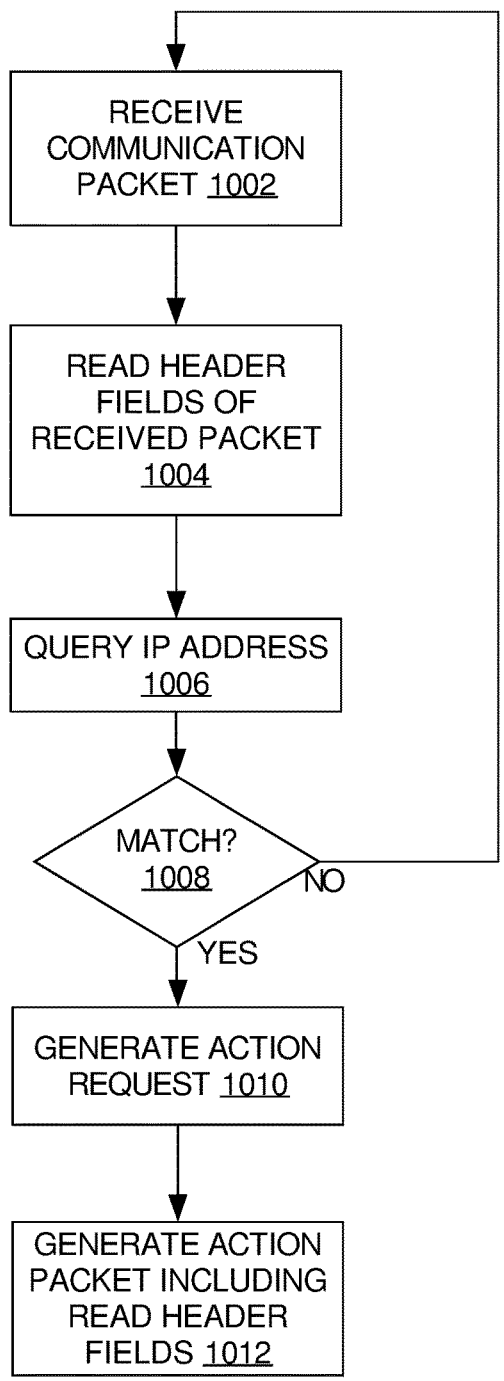
FIG. 10 illustrates a process of remediation of security threats.

FIG. 10 illustrates a process of remediation of security threats. The process can be performed by the sensor computer 110.

In an operation 1002, a communication packet sent by the compromised computer 106 to a target computer is received via a network tap at the sensor computer 110. As discussed above, the communication packet can still be received by the target computer (e.g., the enterprise computer 112). The operation 1002 can be performed by, for example, the PPU 802.

In an operation 1004, the header fields of the received packet are read. The contents of the TCP packet or segment is visible to the sensor computer 110 at least because the sensor computer 110 is co-located with the compromised computer 106. From the read packet, the IP address of the target computer is determined. The operation 1004 can be performed by the PPU 802.

In an operation 1006, the IP address read from the received communication packet is queried. In some instances, the IP address is compared to IP addresses of enterprise computers, including the enterprise computer 112. The operation 1006 can be performed by, for example, the ILU 804.

In an operation 1008, a determination is made as to whether the IP address matches any of the IP addresses of the enterprise computers. The determination can be made by the ILU 804. If it is determined that there is no match, the process of FIG. 10 starts over with the operation 1002.

If, however, it is determined that there is a match, in an operation 1010, an action request is generated. The action request includes an instruction to generate an action packet as a remediation measure. The operation 1010 can be performed by the ILU 804.

In an operation 1012, an action packet is generated that includes at least some of the header fields read from the communication packet. The action packet is generated so as to cause the compromised computer 106 to abort an attempt to establish a connection with the enterprise computer 112, to disconnect an established connection between the compromised computer 106 and the enterprise computer 112, or to slow communication between the compromised computer 106 and the enterprise computer 112. In some embodiments, the action packet can be sent to the firewall 109 or the enterprise computer 112 and effect similar results. Particular remedial measures that can be used are described above.

6.0 Other Aspects of Disclosure

Using the networked computer arrangements, intermediary computer, and/or processing methods described herein, security in client-server data processing may be significantly increased.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method providing an improvement in remediating malware attacks in computer security, comprising:
receiving, using a network tap of a sensor computer that is coupled to and co-located with a compromised computer that hosts or executes malware, a communication packet that was sent from the compromised computer to a target computer and allowed to pass to the target computer;
reading, at the sensor computer, a plurality of fields within a header of the communication packet;
determining, at the sensor computer, that the communication packet is sent as part of a potential malware attack on the target computer;
performing, using the sensor computer, a remediation measure by generating a header of an action packet, wherein the header comprises duplicates of at least some fields of the plurality of fields so as to appear to be generated by the target computer, generating a payload of the action packet, and sending the action packet comprising the generated header and the generated payload to the target computer.

* * * * *